United States Patent [19]
Fujii

[11] Patent Number: 6,128,405
[45] Date of Patent: Oct. 3, 2000

[54] SYSTEM FOR PROCESSING THREE-DIMENSIONAL SHAPE DATA

[75] Inventor: Eiro Fujii, Takatsuki, Japan

[73] Assignee: Minolta Co., Ltd., Osaka, Japan

[21] Appl. No.: 08/917,910

[22] Filed: Aug. 27, 1997

[30] Foreign Application Priority Data

Aug. 30, 1996 [JP] Japan ..................................... 8-229815

[51] Int. Cl.$^7$ .............................. G06K 9/00; G01B 11/24
[52] U.S. Cl. ............................................ 382/154; 356/376
[58] Field of Search ..................................... 382/108, 154, 382/280, 293; 348/138, 147, 213, 262, 580; 356/4.03, 376, 375; 250/559.22, 559.05; 702/94, 95, 150, 151, 152, 153, 159, 167, FOR 131, FOR 144, FOR 145

[56] References Cited

U.S. PATENT DOCUMENTS

| | | | |
|---|---|---|---|
| 4,794,262 | 12/1988 | Sato et al. | 348/138 |
| 4,969,106 | 11/1990 | Voget et al. | 382/154 |
| 5,243,665 | 9/1993 | Maney et al. | 382/154 |
| 5,528,194 | 6/1996 | Ohtani et al. | 382/154 |

FOREIGN PATENT DOCUMENTS 4-259809   9/1992   Japan .

OTHER PUBLICATIONS

"A Method for Registration of 3–D Shapes", Paul J. Besl, Member, IEEE, and Neil D. McKay, E Transactions on Pattern and Analysis and Machine Intelligence, vol. 14, No. 2, Feb. 1992, pp. 239–256.

"Zippered Polygon Meshes From Range Images", Greg Turk and Marc Levoy, Computer Science Department Stanford University, Computer Graphics Proceedings, Annual Conference Series 1994, pp. 311–318.

*Primary Examiner*—Amelia Au
*Assistant Examiner*—Samir Ahmed
*Attorney, Agent, or Firm*—McDermott, Will & Emery

[57] ABSTRACT

In reproducing an object from a plurality of geometric models representing the shape of the object as viewed from different directions around an axis, each of the models is rotated about an axis specified by axis data, a region of each of the models overlapping another one of the models is extracted, and the degree of displacement in the entire set of the models is calculated. This operation is repeated to output a set of the geometric models as rotated about the axis when the degree of displacement is minimum. In this way, a group of items of shape data is obtained which represents a plurality of geometric models corresponding to one object and matched in position with high accuracy.

23 Claims, 9 Drawing Sheets

SYSTEM FOR PROCESSING THREE-DIMENSIONAL SHAPE DATA

BACKGROUND OF THE INVENTION

1. Field of the Invention

The present invention relates to a system for processing three-dimensional shape data for use in combining geometric models (various types of shape data including range images) of a plurality of portions of an object which are different from one anther.

2. Description of the Related Art

Three-dimensional measuring devices of the noncontact type which are termed rangefinders are adapted for measurement at a higher speed than those of the contact type and are therefore used in inputting data to CG systems and CAD systems, measuring human bodies and visual recognition by robots.

The slit beam projection method (also termed the light-section method) is known as a measuring method suited to rangefinders. This method affords three-dimensional images (range images) on the principle of triangulation by optically scanning an object, and is a kind of positive measuring method wherein specified detection light is projected to photograph the object. The three-dimensional image is a set of pixels representing the positions of sampling points on the object in the coordinate system of the camera, and is a kind of geometric model. Used as the detection light in the slit beam projection method is a slit beam which is linear in cross section. Also known are light projection methods using spotlight, stepped light or concentration pattern light instead of the slit beam.

In the three-dimensional measurement of an object by photographing the object from one direction, an invisible region occurs, so that it is impossible to measure the entire object by photographing a single image. It is therefore usual practice to photograph the object from a plurality of positions which are in directions different from one another when viewed from the objects, and to compose the range images obtained by photographing operations. Prior to the composition, the range images need to be matched in position so as to correctly reproduce the object.

To facilitate the position matching of range images, a three-dimensional measuring method has already been proposed which uses a rotary table for placing an object thereon, changing the photographing direction by rotating the table and placing a reference object thereon to obtain data as to the position of the axis of rotation (JP-A-259809/1992). With this method, a plurality of range images can be matched in position by rotating each image about the axis of rotation by an amount corresponding to the amount of rotation of the table for coordinate transformation. This method further permits the rangefinder to be positioned as desired relative to the rotary table (the object), assures the photographing conditions of greater freedom and eliminates the need to accurately measure the position of the rotation axis in the coordinate system of the camera before photographing.

In principle, the range images can be matched in position if the position of the rotation axis and the angle of rotation of the table are given, whereas displacement of each range image is inevitable in actuality owing to an error in the measurement by the rangefinder. In the case where the position of the rotation axis is calculated based on the data obtained by photographing the reference object, calculation errors will cause displacement of the range image.

On the other hand, various methods are proposed for the so-called merge processing wherein a plurality of geometric models corresponding to partially lapping regions of the surface of one object which are different from one another are three-dimensionally so arranged that the laps are in match. For example, "Zippered Polygon Meshes from Range Images," SIGRAPH'94 Proceeding Greg Turk and Marc Lovoy, Computer Science Department, Stanford University, discloses a method wherein points are extracted from each geometric model which should be in match with points on another geometric model (i.e. corresponding points), and a rotation matrix and amount of translation are determined for the coordinate transformation of the geometric models so as to minimize the total sum of distances between the corresponding points. With such merge processing, nevertheless, the six parameters (x. y, z, θx, θy, θz) for specifying the position of origin of the coordinate system and the inclination of the three coordinate axes must be successively altered for each geometric model to find an optimum position-matched state. Consequently, the calculation needed results in a heavy burden, and no proper solution is frequently available within a practical period of time. Additionally, in the case where the geometric models are successively processed one by one for position matching in such manner that a second model is optimized relative to a first model, and a third model is thereafter optimized relative to the second, errors will accumulate to entail successively increased displacements.

OBJECT AND SUMMARY

An object of the present invention is to provide a system for processing three-dimensional shape data to readily obtain a group of items of shape data as to a plurality of geometric models corresponding to one object and matched in position with high accuracy.

The position of axis of rotation is calculated based on axis data given, and the positions of a plurality of geometric models corresponding to one object are matched. With the axis of rotation thereafter shifted slightly, the state of the models as matched in position is corrected so as to diminish the displacement. Since this correction is effected by rotation around the axis, there are four parameters to be altered. The degree of displacement is determined by generally checking the displacement of all the geometric models relative to one anther which models are to be matched in position, whereby the models are made uniform in displacement and improved in reproducing the object.

The correction of position matching need not always be repeated until the displacement is minimized but may be completed when a predetermined requirement is fulfilled, as when the displacement has diminished to not greater than an allowable upper limit or when the axis has been shifted a predetermined number of times. For the correction, each of the geometric models is rotated in its entirety, or only the portion of each model overlapping another model is rotated.

The above object can be attained by the following three dimensional photographing system for photographing an object and producing image data indicating the shape of the object.

A three-dimensional photographing system comprising a camera for photographing the shape of an object from positions round an axis in directions different from one another and specifying angle data indicating the rotational angle of each of the directions relative to another, means for rotating partial geometric models photographed by the camera about an axis specified by axis data indicating the three-dimensional position of the axis in accordance with the relative rotational angle, extraction means for extracting a region of each of the partial geometric models overlapping another one of the models, calculation means for calculating the degree of displacement of the entire set of partial geometric models, alteration means for altering the axis data, repetition means for rotating the overlapping region about the axis as shifted every time the axis data is altered and causing the calculation means to calculate the degree of displacement, and output unit for outputting a set of the partial geometric models as rotated around the axis when the degree of displacement is minimum.

The three-dimension photographing system uses a reference object having two planar faces forming a ridge therebetween, and has means for producing data as to the three-dimensional position of the ridge as the axis data with reference to a geometric model of the reference object.

The invention also provides a three-dimensional image processing process for producing image data indicating the shape of an object from three-dimensional measurement data as to a plurality of partial geometric models representing the shape of the object as viewed from respective positions around the axis of the object in directions different from one another, the process having the step of position-matching the three-dimensional measurement data so as to reproduce the object, based on axis data indicating the three-dimensional position of the axis and angle data indicating the rotational angle of the directions relative to one another, the step of correcting the axis data in accordance with the degree of displacement resulting when each of the partial geometric models is rotated about the axis specified by the axis data in accordance with the relative rotational angle, and the step of rotating the partial geometric models in accordance with the relative rotational angle based on the axis data corrected by the axis data correcting step. The foregoing object can be fulfilled also by this process.

Additionally, the object can be attained also by a computer program product for use in a three-dimensional data processing system for three-dimensionally position-matching a plurality of partial geometric models representing the shape of an object within a visible range as the object is viewed from respective positions around an axis in directions different from one another, based on axis data indicating the three-dimensional position of the axis and angle data indicating the rotational angle of the directions relative to one another, so as to reproduce the object, the computer program product comprising a manager for rotating the partial geometric models in accordance with the relative rotational angle and tentatively matching the models in position, a manager for extracting from each of the models tentatively matched in position a region thereof overlapping another one of the partial geometric models, a manager for calculating the degree of displacement of the overlapping regions from one another in the entire set of the models tentatively matched in position, and a manager for repeating correction of position matching by rotating at least the overlapping regions of the models about an axis different from the axis used in the preceding correction step, in accordance with the relative rotational angle and repeating calculation of the degree of displacement of the overlapping regions from one another, until a predetermined requirement is fulfilled.

The foregoing system, process or the computer program product readily provides a group of items of shape data as to a plurality of geometric models corresponding to one object and matched in position with high accuracy.

The above and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
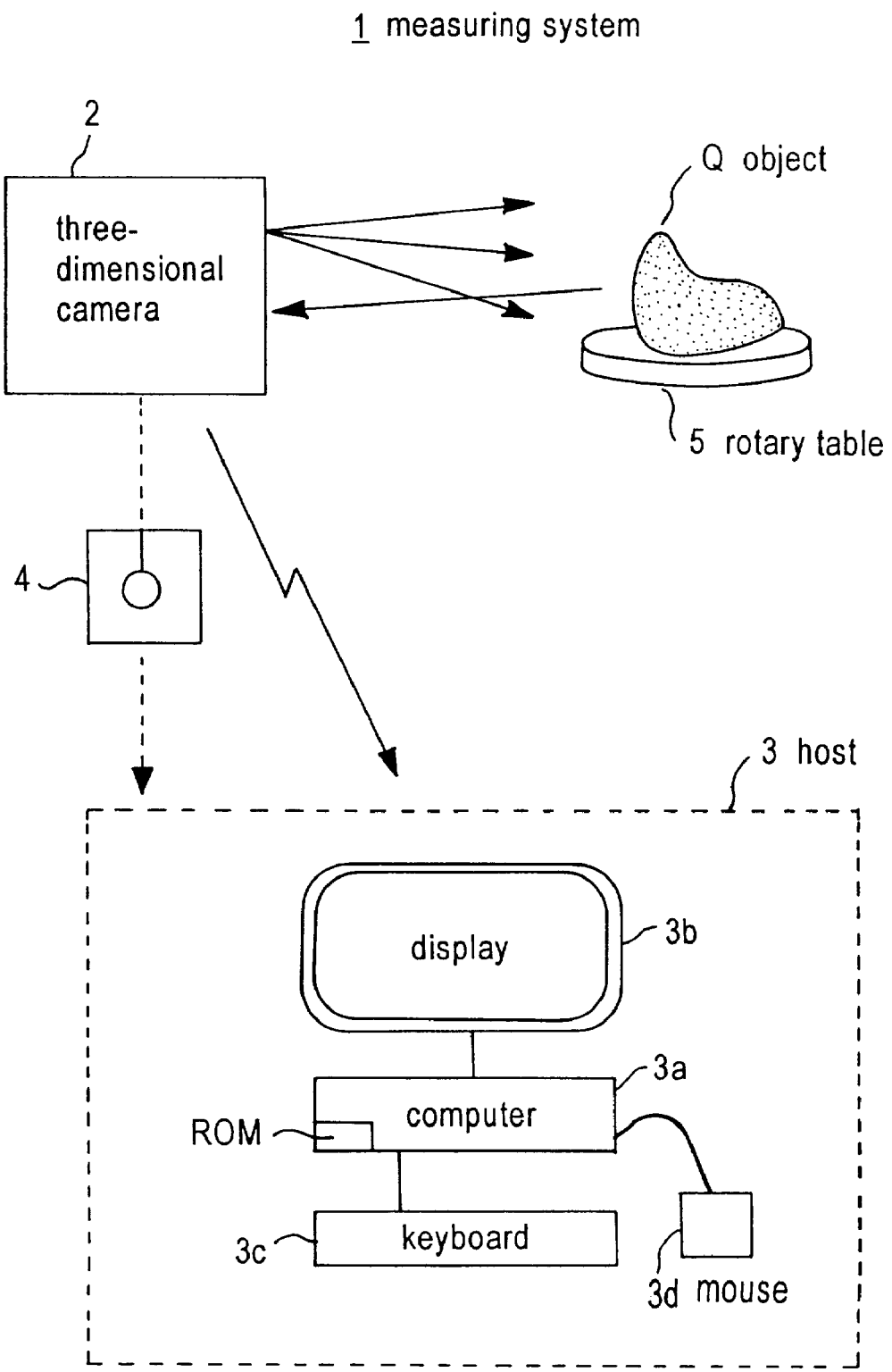
FIG. 1 is a diagram showing a measuring system embodying the invention.

FIG. 1 is a diagram showing a measuring system 1 embodying the invention.

The measuring system 1 comprises a three-dimensional camera (rangefinder) 2 for performing three-dimensional measurement by the slit beam projection method, a host 3 serving as a three-dimensional shape data processor for processing the output data of the camera 2, and a rotary table 5 for photographing an object Q from different directions.

The three-dimensional camera 2 delivers measurement data (slit image data) specifying the three-dimensional positions of many sampling points on the object Q and data required for a two-dimensional image representing color information of the object Q and calibration. The host 3 performs arithmetic operations for determining the coordinates of the sampling points by triangulation, i.e., processing for producing geometric models with use of the camera coordinate system (three-dimensional orthogonal coordinate system) as a local coordinate system. The host 3 also matches the geometric models in position.

The host 3 is a data processing system comprising a computer 3a, display 3b, keyboard 3c and mouse 3d. The computer 3a includes ROM having stored therein software for processing the measurement data. The camera 2 is on-line to the host 3 directly and also via a recording medium 4. Examples of useful recording media 4 are magneto-optic disks (MO), minidisks (MD) and memory cards.

The software for processing the measurement data is stored in the above-mentioned recording medium or hard disk, from which the information is read and fed to the computer 3a or retrieved on-line.

Figure 2:
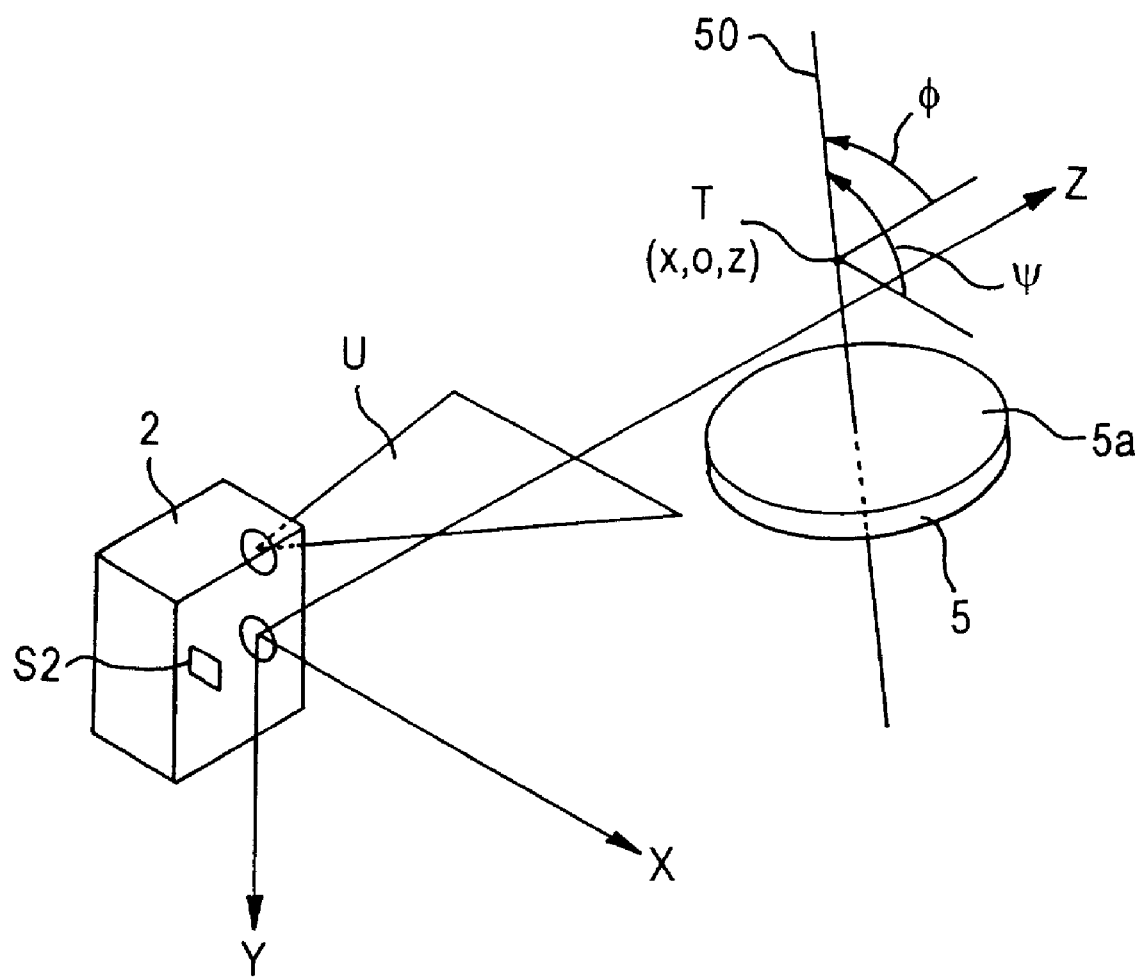
FIG. 2 is a diagram showing the position of a three-dimensional camera and a rotary table relative to each other.

FIG. 2 is a diagram showing the position of the camera 2 and the rotary table 5 relative to each other.

For measuring (photographing), the camera 2 is so directed as to project a slit beam U toward the rotary table 5. The camera coordinate system is an XYZ coordinate system wherein the Z-axis is the light incident axis perpendicular to the image forming plane S2 within the camera 2. The X-direction is the lengthwise direction of the slit beam U. The origin of the camera coordinate system is, for example, the intersection of the foremost surface of the light receiving lens system and the incident axis.

The position of the rotary table 5 is optional insofar as the surface 5a of the table 5 is parallel neither to the X-Y plane nor to the Y-Z plane. The three-dimensional position of the axis 50 of rotation of the table 5 is specified by the coordinates (x, y, z) of the intersection T of the rotation axis 50 and the X-Z plane, the inclination φ about the X-axis and the inclination ψ about the Z-axis. Since the coordinate y of the intersection T is 0, the parameters for specifying the rotation axis 50 are four, i.e., x, z, φ and ψ.

Figure 3A:
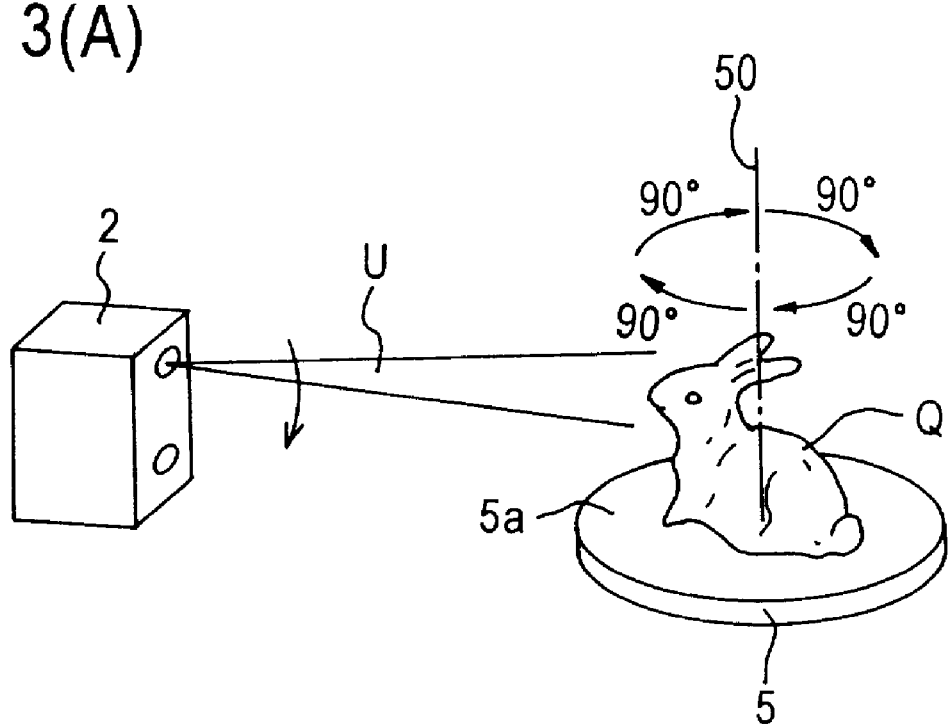
FIGS. 3(A) and 3(B) are diagrams showing a measuring procedure.
Figure 3B:
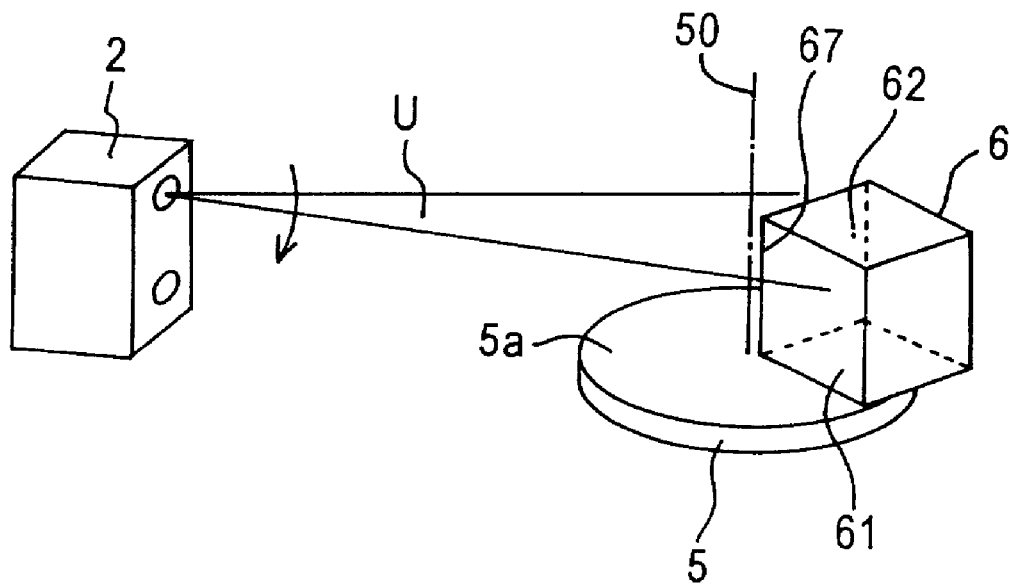
Figure 4:
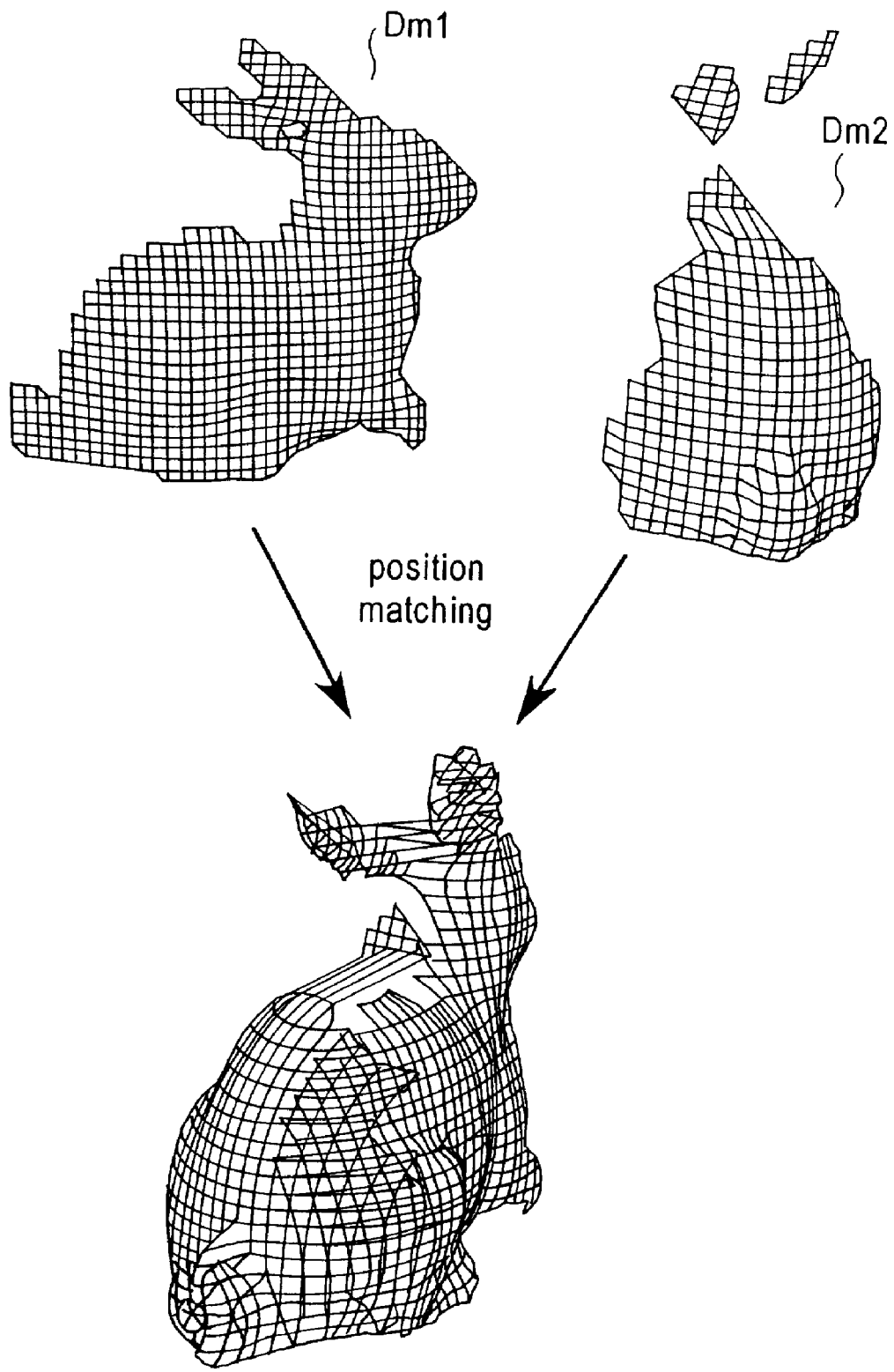
FIG. 4 is a diagram illustrating the concept of position matching.

FIG. 3 includes diagrams showing a measuring procedure, and FIG. 4 is a diagram illustrating the concept of position matching.

First, the object Q (an ornament of rabbit is shown as an example) to be modeled is placed on the rotary table 5 and intermittently rotated, for example, through 90 deg at a time to obtain a plurality of measurements. When the shape of the object is to be measured over the entire periphery, the object is measured, for example, four times [FIG. 3 (B)]. The angle of rotation is not limited to 90 deg but may be determined suitably in conformity with the shape of the object or the angle of coverage so that the coverages will overlap. Different angles may be set for the respective measurements.

Next, the object Q on the table 5 is replaced by a chart 6 in the form of a cube and serving as a reference object. The chart 6 is so positioned that a ridge 67 which is the boundary between two adjacent faces 61, 62 is approximately in coincidence with the rotation axis 50 [FIG. 3(A)]. The ridge 67 need not always be in coincidence with the axis 50 although preferably coincident therewith. The chart 6 can be thus positioned in place readily when the center of the surface 5a of the rotary table is indicated by a mark.

A slit beam U is projected so as to impinge on the faces 61, 62 to measure the shape of the chart 6 like the object Q. The range image of the faces 61, 62 is thereafter analyzed to calculate the position and direction of the ridge 67. Thus, data as to the approximate position of the rotation axis 50 is obtained by a single photographing operation. The chart 6 is not limited to a cube but may be one having faces 61, 62 providing a ridge, e.g., an L-shaped wall. The chart 6 may be measured prior to the measurement of the object Q.

The data obtained by a total of five measuring operations of the above procedure is fed to the host 3, in which geometric models (range images) are produced from the measurement data. Prepared in the present mode of embodiment are four partial geometric models corresponding to portions of the object Q which are different from one another, and one geometric model (chart model) corresponding to the chart 6. The approximate position of the rotation axis 50 is calculated from the chart model. Position matching (coordinate transformation) of the four partial geometric models is performed based on the result of calculation (axis data) and angle data indicating preregistered angles of rotation (0 deg, 90 deg, 180 deg, 270 deg) of the rotary table 5. FIG. 4 shows position matching of two partial geometric models Dm1 and Dm2.

Figure 5:
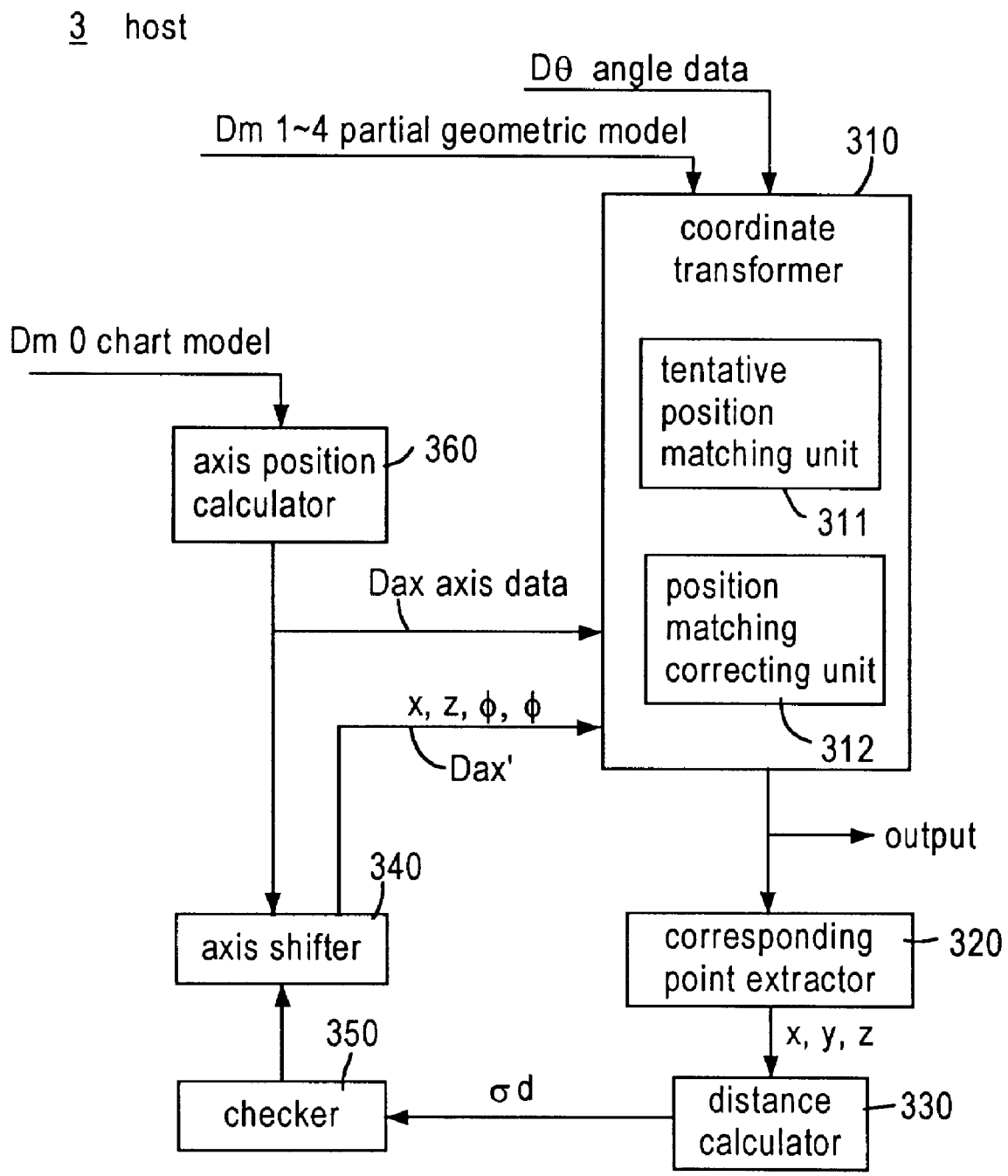
FIG. 5 is a functional block diagram of main components of a host.

FIG. 5 is a functional block diagram of the main components of the host 3.

The host 3 comprises a coordinate transformer 310 composed of a tentative position matching unit 311 and a position matching correcting unit 312, corresponding point extractor 320 for extracting pairs of points (sampling points) to be in register, a distance calculator 330 for calculating the distance between each of the pairs of points (corresponding points) and the average distance, an axis shifter 340 for finely varying the four parameters for specifying the rotation axis 50, a checker 350 for checking the acceptability of position matching based on the result of calculations by the distance calculator 330, and axis position calculator 360 for determining the position of the rotation axis 50 of the rotary table 5 based on the chart model Dm0. These components are realized by software and hardware consisting mainly of a processor.

The tentative position matching unit 311 matches the positions of the four partial geometric models Dm1–4 (initial arrangement) based on the above-mentioned angle data Dθ and the axis data Dax from the axis position calculator 360. The position matching correcting unit 312 matches (corrects) the positions of the four partial geometric models Dm1–4 based on the angle data Dθ and the axis data Dax' from the axis shifter 340. For the correction, all the sampling points of the models Dm1–4 may be rotated, or only the sampling points extracted by the corresponding point extractor 320 may be rotated.

In the present mode of embodiment, the checker 350, the axis shifter 340 and position matching correcting unit 312 operate in cooperation to effect repeated correction until the specified conditions are established. The partial geometric models Dm1–4 are processed again for coordinate transformation based on the axis data Dax or Dax' available when the average of the distances between the pairs of corresponding points (sum of the distances/number of pairs) is minimum, and the result is output as a group of items of shape data corresponding to the object Q. The output is transferred to other device, processed for composition or otherwise delivered for some other application, or stored in a memory medium.

Figure 6:
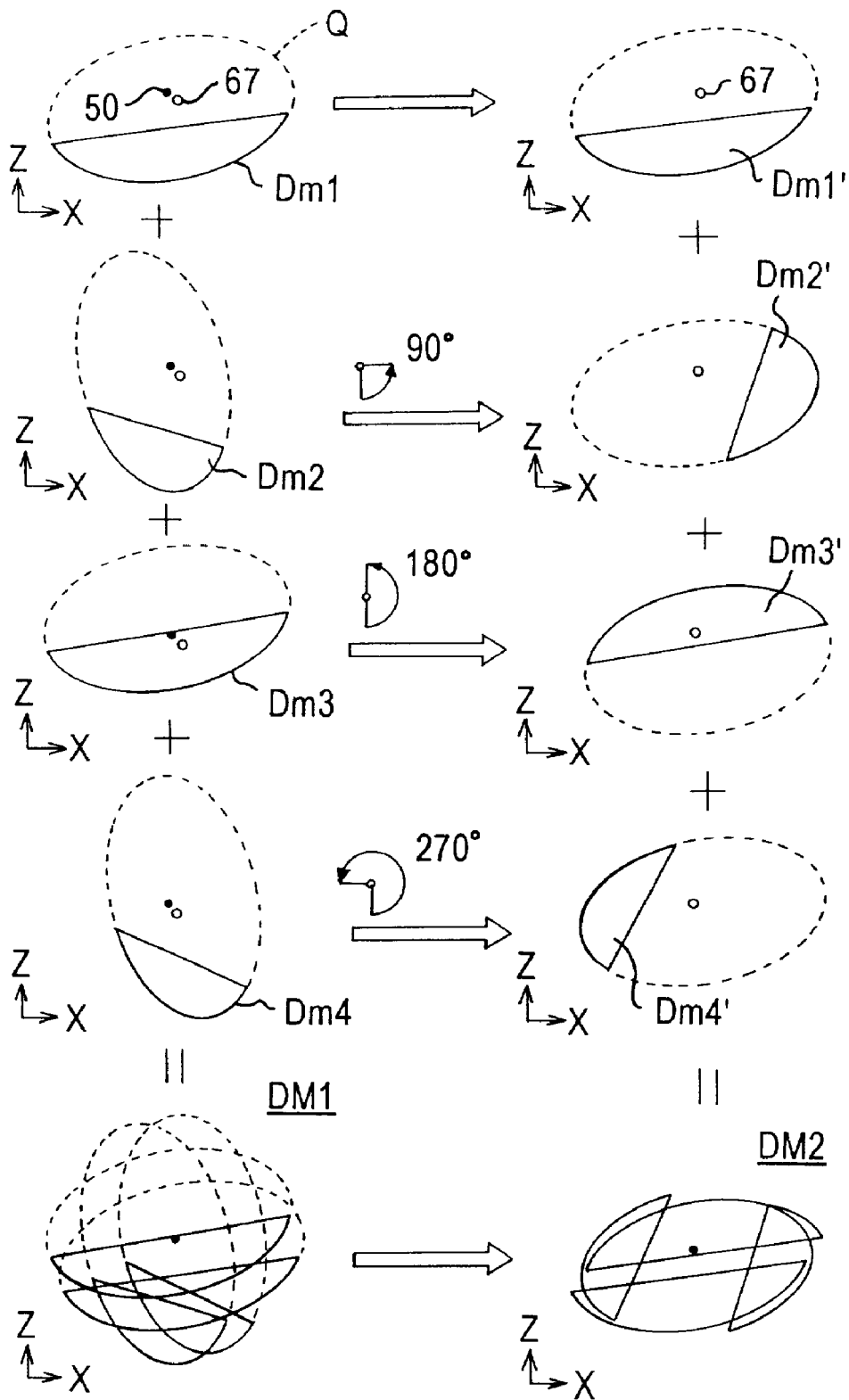
FIG. 6 is a diagram showing coordinate transformation.

FIG. 6 is a diagram schematically showing coordinate transformation. In the diagram, the solid circle indicates the position of the rotation axis 50, and the blank circle the position of the ridge 67.

Since the direction in which the four partial geometric models Dm1–4 are photographed differs by 90 deg from model to model when the direction is viewed from the object, the set DM1 of the models Dm1–4 is away from the object Q. For the initial arrangement, the models Dm1–4 are rotated through 0 deg, 90 deg, 180 deg and 270 deg, respectively. The axis of rotation is the ridge 67 indicated by the axis data Dax. The set DM2 of the partial geometric models Dm1', Dm2', Dm3', Dm4' as rotated reproduces the configuration of the object Q over the entire periphery thereof. However, the errors involved in placing the chart 6 and in photography displace the models Dm1'–4' from one another, so that the position matching is corrected.

Figure 7A:
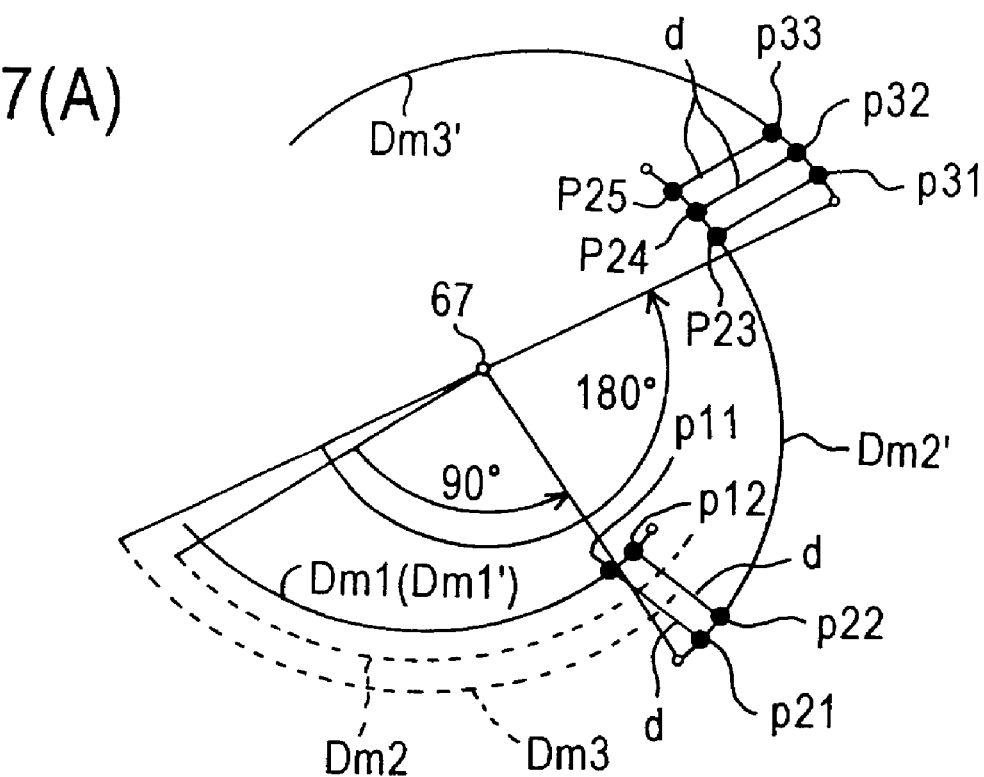
FIGS. 7(A) and 7(B) are diagrams showing correction of position matching.
Figure 7B:
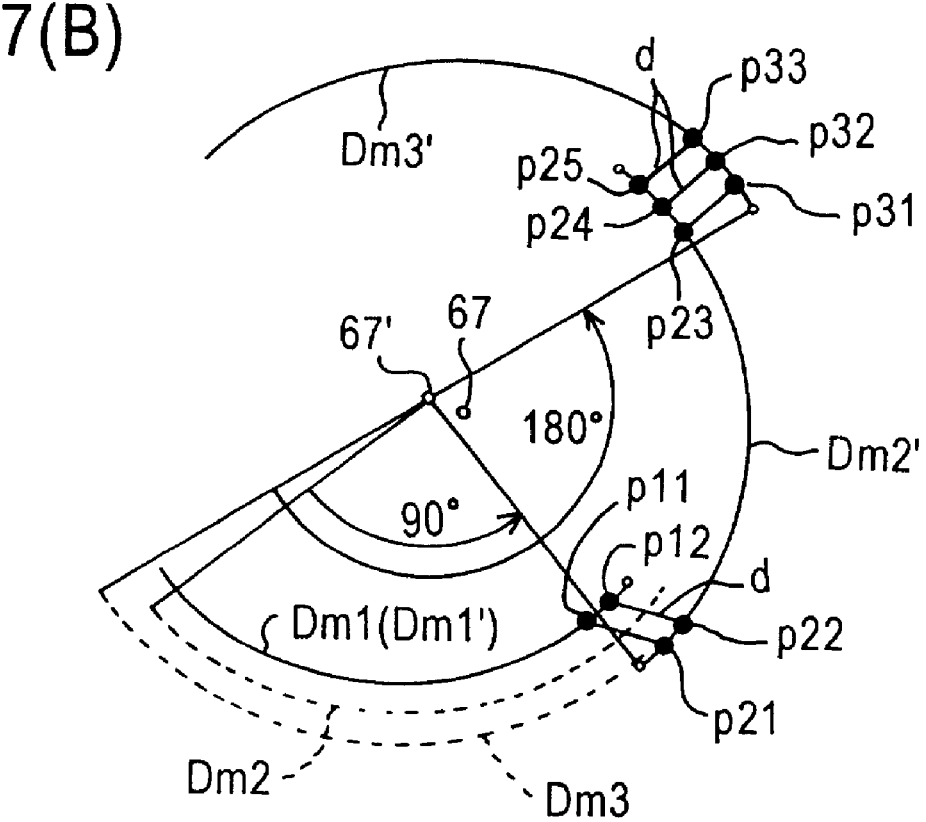
Figure 8:
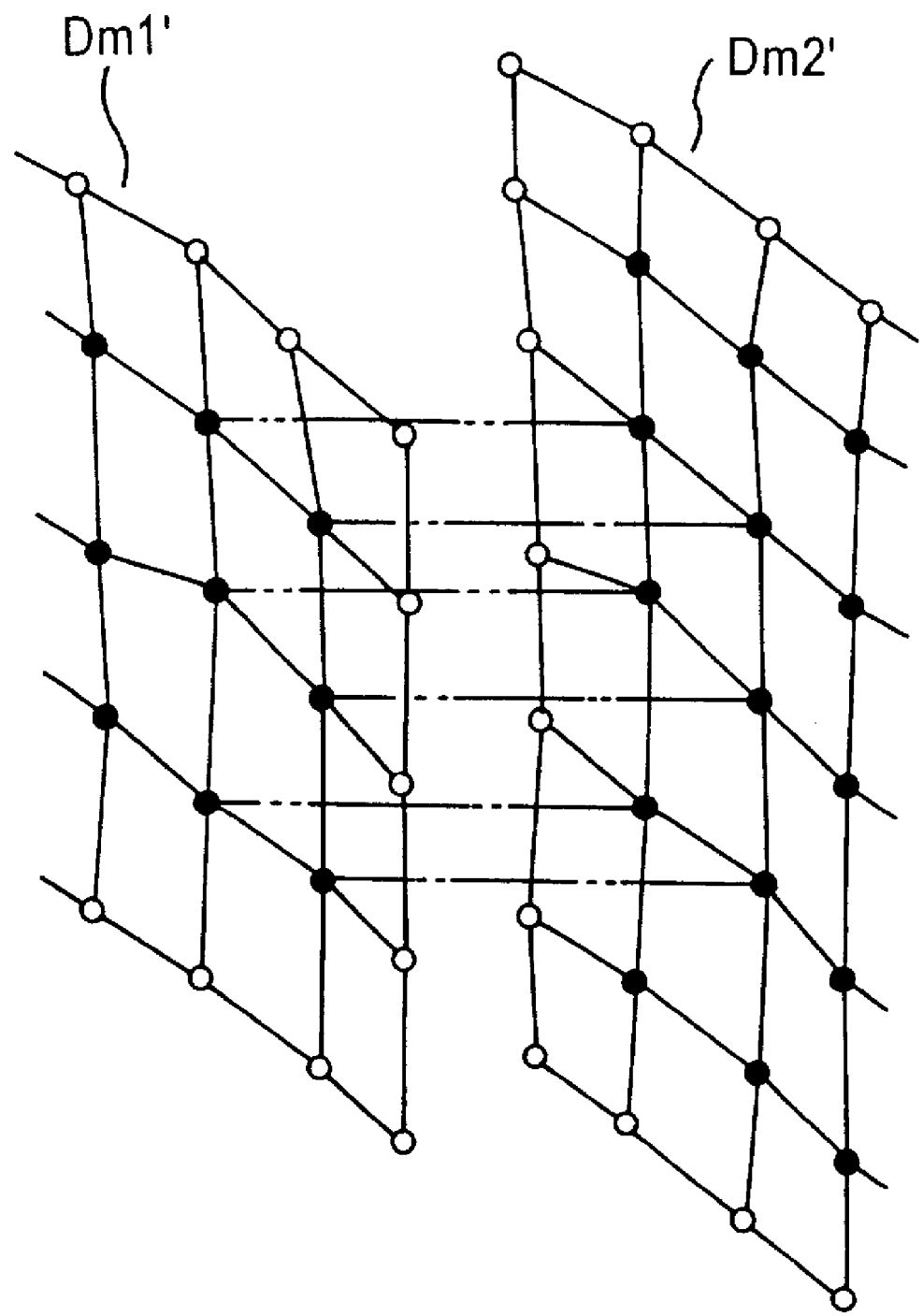
FIG. 8 is a diagram for illustrating extraction of corresponding points.

FIG. 7 includes diagrams for illustrating correction of position matching, and FIG. 8 is a diagram showing extraction of the corresponding points. For simplified illustration, three partial geometric models Dm1–3 are to be position-matched.

FIG. 7 (A) shows the models as initially arranged. The corresponding point extractor 320 checks points (sampling points for measurement) on each of the partial geometric models Dm1', Dm2', Dm3' after coordinate transformation as to the distance d from these points to the corresponding points on other model Dm1', Dm2', Dm3', and among the points with which the distance is not greater than a reference value, the point in the closest proximity is taken as the point to be in register with the point noted. The two points to be in register are stored as a pair of corresponding points. The reference value is, for example, a value about twice the resolution of measurement (sampling interval). In the example shown in FIG. 7 (A), two points p11, p12 on the model Dm1' are paired respectively with points p21, p22 on the model Dm2', and three points p23, p24, p25 on the model Dm2' are paired respectively with points p31, p32, p33 on the model Dm3'. The average of the distances d between the pairs of points thus extracted provides an index indicating the degree of displacement. The extraction of corresponding points, i.e., the extraction of the overlapping portions of the models, is made on the basis of three-dimensional point-to-point distances d as shown in FIG. 8.

For the correction of position matching subsequent to the initial arrangement, the partial geometric models Dm1–3 are rotated (coordinate transformation) about the axis (ridge) 67 as shifted by a very small amount, i.e., about an axis 67'. The average of distances d on the basis of altered coordinates is calculated for the pairs of corresponding points previously extracted, and the acceptability of correction is checked based on the average. Correction is thereafter repeated so as to decrease the average value of distances d.

Figure 9:
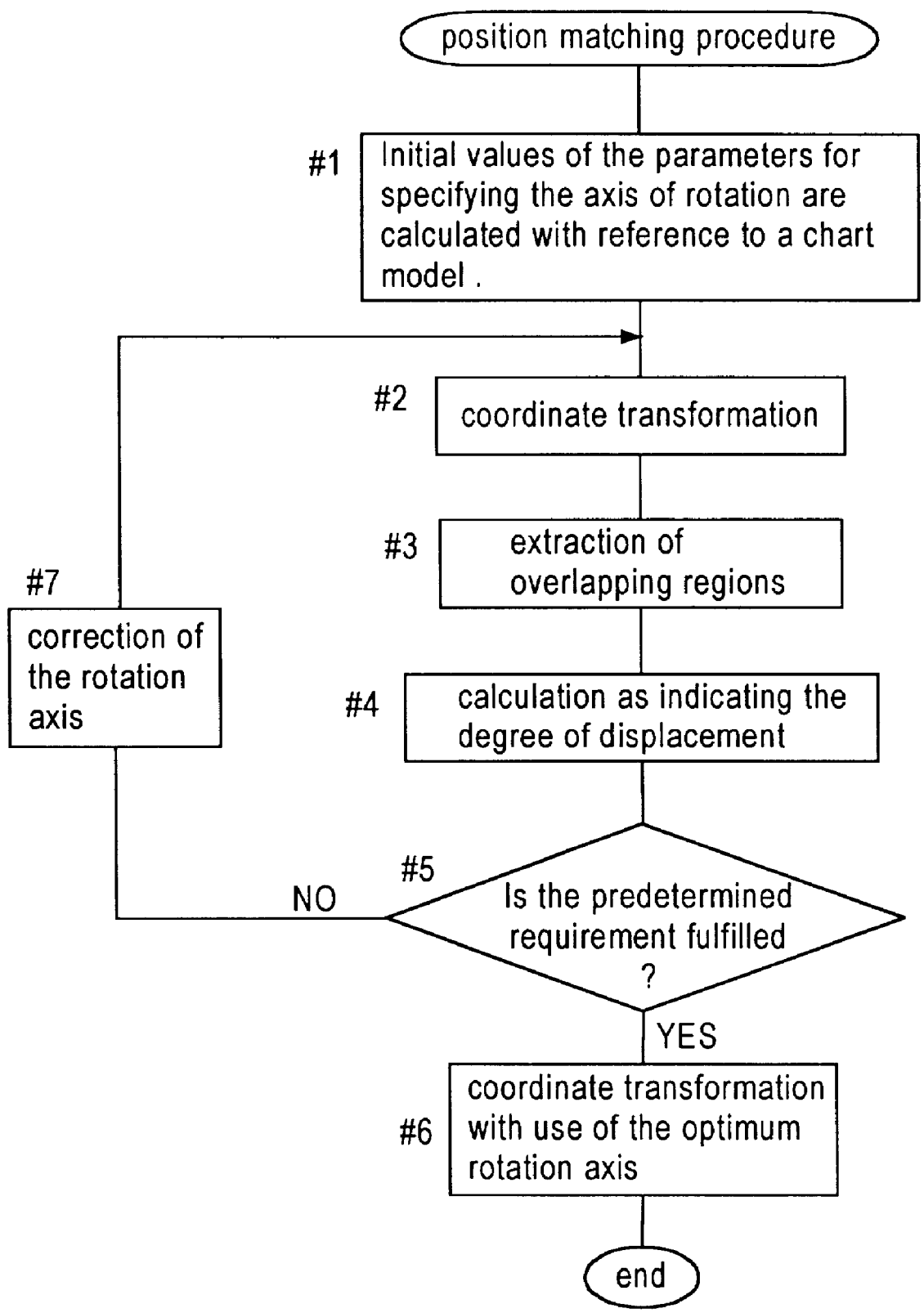
FIG. 9 is a flow chart of a position matching procedure to be executed by the host.

FIG. 9 is a flow chart of the position matching procedure to be executed by the host 3 based on the software stored in the ROM.

Initial values of the four parameters for specifying the axis of rotation are calculated as axis data Dax with reference to a chart model DM0 (#1). Coordinate transformation by rotating the partial geometric models about the calculated axis is followed by position matching of the models Dm1–4 (#2). overlapping regions are extracted (#3), and the average of distances d is calculated as indicating the degree of displacement (#4).

If the average of distances d is sufficiently small, or hen the average reaches a convergent value (minimum) due to the shift of the axis, that is, when the predetermined requirement s fulfilled, the axis with which the average is minimum is used or coordinate transformation, and the result is output (#5, #6). If the requirement is not met, the axis is shifted, followed by coordinate transformation of all geometric models (#5 #7 #2). If all the sampling points on the partial geometric models Dm1–4 have been rotated in the coordinate transformation of #2, the coordinate transformation of #6 with use of the optimum rotation axis is not particularly needed. Incidentally, the pairs of corresponding points extracted from the models in the initial arrangement are not always true pairs, so that at a stage where the displacement has been diminished to some extent, corresponding points can be extracted again. If points in the vicinity of the corresponding points initially extracted are registered as possible corresponding points at the time of initial extraction, the corresponding points and the possibles only are usable for the calculation of distances d to expedite re-extraction.

Correction of position matching will be described below in greater detail.

When axis vector P is expressed by the angle ϕ of rotation bout the X-axis and the angle ψ of rotation about the Z-axis, $$P(\phi, \psi) = (\sin \psi, \cos \psi \cdot \cos \phi, -\cos \psi \cdot \sin \phi) \quad (1)$$

Assuming that $P(\phi, \psi)=(b1, b2, b3)$, the transformation atrix R1 to the coordinate system with the Y-axis serving as he rotation axis is expressed by Equation (2).

$$R1 = \begin{bmatrix} b2/M & -b1/M & 0 \\ b1 & b2 & b3 \\ -b1*b3/M & -b2*b3/M & M \end{bmatrix} \quad (2)$$

wherein $M = \sqrt{b1^2 + b2^2}$

When the position T of the axis is expressed by Equation (3) and when the angle of rotation of the table 5 for the ith photographic operation is 1, the matrix R2 of rotation about the Y-axis is expressed by Equation (4).

$$T(x, z) = (x, 0, z) \quad (3)$$

$$R2 = \begin{bmatrix} \cos\theta i & 0 & -\sin\theta i \\ 0 & 1 & 0 \\ \sin\theta i & 0 & \cos\theta i \end{bmatrix} \quad (4)$$

Accordingly, the coordinates Si' of each point on the partial geometric model of the object Q corresponding to the ith photographing operation and as rotated are expressed by Equation (5) wherein the original coordinates are Si.

$$Di'=R2R1\,(Si-T) \quad (5)$$

By the coordinate transformation of Equation (5), the partial geometric models Dm1–4 are arranged at the position where the object Q is nearly reproduced although the arrangement may involve a slight displacement.

In extracting the overlapping regions (sets of corresponding points) from the partial geometric models Dm1'–4' which are generally matched in position, use is made of the requirement that the angle of intersection of average normals at the respective points should be less than 90 deg, in addition to the requirement that the distance d should be not greater than the reference value as previously stated. This eliminates errors in extraction more reliably. The overlapping regions are not always correct because of errors involved in the measurements and in calculating the axis data Dax. Within a region fulfilling the above requirements, a position closer to the center of the region is more likely to be within the true overlapping region. To ensure extraction with improved reliability, therefore, the outermost point of the region meeting the above requirements is excluded from the overlapping region.

The distance dik between a point pik on the ith model and the corresponding point pjk on the j(=i+1)th model is given by:

$$dik=(Sik'-Sjk')^2 \quad (6)$$

wherein Sik' is the coordinates of the point pik, and Sjk' is the coordinates of the point pjk. The average value d of the distances d of the entire set of four partial geometric models Dm1'–4' is expressed by Equation (7).

$$\sigma d(\phi, \varphi, x, z) = \frac{1}{N} * \sum_{i=1}^{4} \sum_{k=1}^{m} dik \quad (7)$$

wherein m is the number of corresponding points on each partial geometric models, and N is the total number of corresponding points.

For the correction of position matching, partial differentiation operation is performed on Equation (7) to update the parameters $\phi$, $\psi$, x, z in a direction to reduce the average d. The average d is minimized by the so-called down-hill method.

The displacement can be evaluated based on the distance between a particular point noted and the face corresponding thereto. For example, suppose the average normal at a corresponding point is the normal to the face, and the face extending through this corresponding point is expressed by $$Aik\ Sik - \delta ik = 0$$

The distance dik between the point pik noted and the face is then expressed by Equation (8).

$$dik = (Aik\ Sik - \delta ik)^2 \qquad (8)$$

According to the embodiment described above, the displacement is evaluated in terms of the average d of distances d in the entire set of partial geometric models Dm1'–4', whereby the accumulation of errors is avoidable that would occur in the case where the models Dm1'–4' are position-matched successively, two models at a time. This realizes position matching with uniform displacement in closer conformity with the object Q.

Since the axis data Dax is calculated from a range image of the chart 6, there is no need to measure the position of the axis in advance, ensuring great freedom in arranging the three-dimensional camera 2 and the rotary table 5 relative to each other. The use of the chart 6 having two planar faces 61, 62 provides the axis data Dax by a single chart photographing operation.

In setting initial values for the axis of rotation, the chart need not always be used. Approximate values may be input manually, or predetermined values are usable when the position relationship between the three-dimensional camera 2 and the rotary table 5 is more or less known. The errors involved in the set values are automatically corrected by the shaft shifting function of the host 3.

The embodiments of the invention afford a group of items of shape data as to a plurality of geometric models corresponding to one object and matched in position with high accuracy.

Additionally there is no particular need to input axis data in producing geometric models using a rangefinder since the axis data is available by measuring a reference object like the contemplated object.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A three-dimensional photographing system comprising:
   a camera for photographing the shape of an object from positions around an axis in directions different from one another and specifying angle data indicating the rotational angle of each of the directions relative to another;
   a means for rotating partial geometric models photographed by the camera about a provisional axis specified by provisional axis data indicating the three-dimensional position of the axis in accordance with the relative rotational angle;
   an extraction means for extracting a region of each of the partial geometric models overlapping another one of the models,
   a calculation means for calculating the degree of displacement of the entire set of partial geometric models;
   an alteration means for altering the provisional axis data;
   a repetition means for rotating the overlapping region about the provisional axis as shifted every time the provisional axis data is altered and causing the calculation means to calculate the degree of displacement, and;
   an output unit for outputting a set of the partial geometric models as rotated around the provisional axis when the degree of displacement is minimum.

2. A three-dimensional photographing system of claim 1, herein said repetition means has a detector which detects the degree of displacement, when the degree of displacement is allowable, the repetition means is stopped.

3. A three-dimensional photographing system of claim 1, wherein said repetition means has a counter means which counts the number of times the repetition means is stopped.

4. A three-dimensional photographing system of claim 1, wherein said camera projects a slit beam.

5. A three-dimensional image processing apparatus for producing image data indicating the shape of an object from a plurality of partial geometric models representing the shape of the object as viewed from respective positions around the axis of the object in directions different from one another, comprising:
   an input unit for inputting a three-dimensional measurement data as to the plurality of partial geometric models representing the shape of the object;
   a coordinate transformation unit for position-matching the three-dimensional measurement data so as to reproduce the object, based on axis data indicating the three-dimensional position of the axis and angle data indicating the rotational angle of the directions relative to one another;
   an axis data correction unit for correcting the axis data in accordance with the degree of displacement resulting when each of the partial geometric models is rotated about the axis specified by the axis data in accordance with the relative rotational angle, and;
   an output unit for outputting a data set of the partial geometric models as rotating the partial geometric models in accordance with the relative rotational angle based on the axis data corrected by the axis data correction unit.

6. A three-dimensional data processing apparatus for three-dimensionally position-matching a plurality of partial geometric models representing the shape of an object within a visible range as the object is viewed from respective positions around an axis in directions different from one another, based on axis data indicating the three-dimensional position of the axis and angle data indicating the rotational angle of the directions relative to one another, the three-dimensional data processing apparatus comprising:
   a rotation device for rotating the partial geometric models in accordance with the relative rotational angle and tentatively matching the models in position,
   an extraction device for extracting from each of the models tentatively matched in position a region thereof overlapping another one of the partial geometric models;
   a calculator for calculating the degree of displacement of the overlapping regions from one another in the entire set of the models tentatively matched in position;
   a corrector for repeating correction of position matching by rotating at least the overlapping regions of the models about an axis different from the axis used in the preceding correction, in accordance with the relative rotational angle, and repeating calculation of the degree of displacement of the overlapping regions from one another, until a predetermined requirement is fulfilled; and an output device for outputting a data set of the partial geometric models as rotating the partial geometric models in accordance with the relative rotational angle based on the axis data corrected by the corrector.

7. A three-dimensional photographing apparatus of claim 6, wherein the three-dimension photographing apparatus uses a reference object having two planar faces forming a ridge therebetween, and has means for producing data as to the three-dimensional position of the ridge as the axis data with reference to a geometric model of the reference object.

8. A three-dimensional photographing system comprising:

a camera for photographing an object;

a photographic means for taking photographs by the camera from positions around an axis in directions different from one another;

a rotating means for rotating an object image photographed by the camera about a provisional axis in accordance with the relative rotational angle;

an extraction means for extracting a region of each of the object images overlapping another one of the object images;

a calculation means for calculating the amount of displacement of the entire set of object images;

an alteration means for altering the provisional axis data;

a repetition means for repeating to perform the rotating means, extraction means, calculation means, and alteration means until the amount of displacement of the entire set of objects is smaller than a predetermined amount, and;

an output unit for outputting a set of the object images as rotated around the axis when the amount of displacement is smaller than predetermined amount.

9. A three-dimensional photographing system comprising:

a camera for photographing an object;

a photographic means for taking photographs by the camera from positions around an axis in directions different from one another;

a rotating means for rotating an object image photographed by the camera about a provisional axis in accordance with the relative rotational angle;

an extraction means for extracting a region of each of the object images overlapping another one of the object images;

a calculation means for calculating the amount of displacement of the entire set of object images;

an alteration means for altering the provisional axis data;

a repetition means for causing repetition of operations of the rotating means, extraction means, calculation means, and alteration means, until the number of repetition times comes to a predetermined number, and;

an output unit for outputting a set of the object images as rotated around the axis when the amount of displacement is minimum.

10. A three-dimensional image processing process for producing image data indicating the shape of an object from three-dimensional measurement data as to a plurality of partial geometric models, representing the shape of the object as viewed from respective positions around the axis of the object in directions different from one another, the process comprising:

the step of position-matching the three-dimensional measurement data so as to reproduce the object, based on axis data indicating the three-dimensional position of the axis and angle data indicating the rotational angle of the directions relative to one another, the step of correcting the axis data in accordance with the degree of displacement resulting when each of the partial geometric models is rotated about the axis specified by the axis data in accordance with the relative rotational angle, and;

the step of rotating the partial geometric models in accordance with the relative rotational angle based on the axis data corrected by the axis data correcting step.

11. A method of three-dimensional image processing comprising the steps of:

(a) photographing by a camera from positions around an axis in directions different from one another;

(b) rotating an object image photographed by the camera about a provisional axis in accordance with the relative rotational angle;

(c) extracting a region of each of the object images overlapping another one of the object images;

(d) calculating the amount of displacement of the entire set of object images;

(e) altering the provisional axis data;

(f) repeating to perform the steps (b),(c),(d), and (e), until the amount of displacement of the entire set of object images is smaller than a predetermined amount, and;

(g) producing a set of the object images as rotated around the axis when the amount of displacement is smaller than predetermined amount.

12. A method of three-dimensional image processing comprising the steps of:

(a) photographing by a camera from positions around an axis in directions different from one another;

(b) rotating an object image photographed by the camera about a provisional axis;

(c) extracting a region of each of the object images overlapping another one of the object images;

(d) calculating the amount of displacement of the entire set of object images;

(e) altering the provisional axis data;

(f) repeating to perform the steps (b),(c),(d), and (e), until the number of repeating times comes to a predetermined number, and;

(g) producing a set of the object images as rotated around the axis when the amount of displacement is minimum.

13. A computer program product for use in a three-dimensional data processing system for three-dimensionally position-matching a plurality of partial geometric models representing the shape of an object within a visible range as the object is viewed from respective positions around an axis in directions different from one another, based on axis data indicating the three-dimensional position of the axis and angle data indicating the rotational angle of the directions relative to one another, the computer program product comprising:

means for rotating the partial geometric models in accordance with the relative rotational angle and tentatively matching the models in position, means for extracting from each of the models tentatively matched in position a region thereof overlapping another one of the partial geometric models, means for calculating the degree of displacement of the overlapping regions from one another in the entire set of the models tentatively matched in position, and means for repeating correction of position matching by rotating at least the overlapping regions of the models about an axis different from the axis used in the preceding correction step, in accordance with the relative rotational angle and repeating calculation of the degree of displacement of the overlapping regions from one another, until a predetermined requirement is fulfilled.

14. A three-dimensional photographing apparatus comprising:

a device for obtaining an image data of an object from positions around an axis;

a device for detecting a degree of displacement of a plurality of geometric models by rotating said plurality of geometric models about a provisional axis;

a device for shifting said provisional axis to a new provisional axis when the degree of displacement is detected to be out of a range of predetermined values; and a device for outputting a set of the geometric models when the degree of displacement is within the range of predetermined values.

15. The apparatus of claim 14, wherein the device for shifting said provisional axis sets an optimal axis when the degree of displacement is detected to be in the range of predetermined values.

16. A method of three-dimensional image processing comprising the steps of:

obtaining an image data of an object from positions around an axis;

detecting a degree of displacement of a plurality of geometric models by rotating said plurality of geometric models about a provisional axis;

shifting said provisional axis to a new provisional axis when the degree of displacement is detected to be out of a range of predetermined values; and outputting a set of the geometric models when the degree of displacement is within the range of predetermined values.

17. The apparatus of claim 16, wherein the step of shifting said provisional axis, further includes the step of setting an optimal axis when the degree of displacement is detected to be in the range of predetermined values.

18. A three-dimensional photographing apparatus comprising;

a device for obtaining image data of at least three images of an object from positions around an axis;

a device for detecting a degree of displacement of at least three geometric models based on two overlapped regions by rotating said geometric models about a provisional axis;

a device for shifting said provisional axis to a new provisional axis when the degree of displacement is detected to be out of a range of predetermined values; and a device for outputting a set of the geometric models when the degree of displacement is within the range of predetermined values.

19. The apparatus of claim 18, wherein the device for shifting said provisional axis sets an optimal axis when the degree of displacement is detected to be in the range of predetermined values.

20. A three-dimensional photographing apparatus comprising;

a device for obtaining image data of an object from positions around an axis;

a device for detecting a degree of displacement of geometric models based on overlapped regions by rotating said geometric models about a provisional axis;

a device for shifting said provisional axis to a new provisional axis when the degree of displacement is detected to be out of a range of predetermined values; and a device for outputting a set of the geometric models when the degree of displacement is within the range of predetermined values.

21. The apparatus of claim 20, wherein the device for shifting said provisional axis sets an optimal axis when the degree of displacement is detected to be in the range of predetermined values.

22. A three-dimensional photographing apparatus comprising:

a device for obtaining data of at least two images of an object from positions around an axis;

a first detecting device for detecting a first degree of displacement of a plurality of geometric models by rotating said geometric models around a first axis;

a second detecting device for detecting a second degree of displacement by rotating said geometric models around a second axis;

a device for determining an optimal axis chosen from one of said first axis and said second axis, by comparing the first degree of displacement with the second degree of displacement; and a device for outputting a set of the geometric models about the optimal axis when a degree of displacement is within a range of predetermined values.

23. The apparatus of claim 22, wherein the device for determining an optimal axis sets a new second axis when the degree of displacement is detected to be out of the range of predetermined values.

* * * * *